United States Patent
Achenbach et al.

(10) Patent No.: US 8,181,979 B2
(45) Date of Patent: May 22, 2012

(54) SUSPENSION FORK FOR A BICYCLE

(75) Inventors: Martin Achenbach, Biel (CH); Valentin Wendel, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 272 days.

(21) Appl. No.: 12/617,552

(22) Filed: Nov. 12, 2009

(65) Prior Publication Data

US 2010/0117322 A1     May 13, 2010

(30) Foreign Application Priority Data

Nov. 13, 2008 (DE) .......... 10 2008 057 267

(51) Int. Cl.
*B62K 21/02* (2006.01)
*F16F 9/34* (2006.01)

(52) U.S. Cl. ......... 280/276; 188/275; 188/297; 280/284

(58) Field of Classification Search .......... 280/276, 280/279, 284, 285, 288; 188/275, 297
See application file for complete search history.

(56) References Cited

U.S. PATENT DOCUMENTS

| | | | | |
|---|---|---|---|---|
| 4,971,344 | A | * | 11/1990 | Turner ............ 280/276 |
| 5,022,501 | A | | 6/1991 | Hayashi et al. |
| 5,580,075 | A | * | 12/1996 | Turner et al. ......... 280/276 |
| 6,382,370 | B1 | | 5/2002 | Girvin |
| 6,491,146 | B1 | * | 12/2002 | Yi et al. ......... 188/319.2 |
| 6,688,626 | B2 | | 2/2004 | Felsl et al. |
| 7,448,638 | B2 | * | 11/2008 | Fox .............. 280/276 |
| 7,766,135 | B2 | * | 8/2010 | Fox .............. 188/275 |
| 2003/0001358 | A1 | | 1/2003 | Becker et al. |

FOREIGN PATENT DOCUMENTS

| | | |
|---|---|---|
| DE | 298 10 431 U1 | 11/1999 |
| DE | 10 2006 009 759 A1 | 9/2007 |
| GB | 1 490 111 | 10/1977 |
| GB | 2 415 027 A | 12/2005 |
| JP | 55-33929 | 3/1980 |
| WO | WO 01/15964 A1 | 3/2001 |
| WO | WO 01/70563 A1 | 9/2001 |

* cited by examiner

*Primary Examiner* — Tony H. Winner
*Assistant Examiner* — Marc Scharich
(74) *Attorney, Agent, or Firm* — Greer, Burns & Crain, Ltd.

(57) ABSTRACT

A suspension fork for a bicycle includes at least one stanchion tube and at least one slider tube interacting therewith and a wheel receiving space adjacent thereto. The suspension fork includes a damper system with a damper chamber divided into a first chamber and a second chamber by a movable piston. The suspension fork further includes a damping device for the rebound stage and a damping device for the compression stage are provided. A shut-off valve is provided for selectively locking the rebound stage. The damper chamber comprises a connecting duct with a flow damper that connects the second chamber with the first chamber when the stanchion tube and the slider tube interacting therewith are compressed more than a predefined distance such that in the case of a forceful compression and with the shut-off valve of the rebound stage activated, slow decompression is allowed up to a damper position as defined by the predetermined distance.

15 Claims, 9 Drawing Sheets

SUSPENSION FORK FOR A BICYCLE

BACKGROUND

The present invention relates to a suspension fork for a bicycle.

Employing suspension forks in bicycles has basically been known for a long time. Suspension forks configured in particular as telescopic suspension forks are installed in downhill and mountain bikes and in cross-country bikes, and increasingly in everyday bicycles as well.

Most suspension forks comprise a pair of tubes stationary that are relative to the bicycle frame, the so-called stanchion tubes, and two lower, movable tubes, the so-called slider tubes, to which the wheel hub is fastened. The stanchion tubes may be held together by means of a fork bridge or fork crown at the center of which the fork column is attached as a rule. Most slider tubes or outer tubes are larger in diameter so as to accommodate the stanchion tubes to be slidingly displaceable in the slider tubes.

The riders of suspension fork-equipped bicycles desire suspension forks whose springing and damping characteristics can be easily and quickly adjusted to speedily adapt the current suspension fork characteristics to actual ambient conditions.

When the cyclist rides up a steep hill or a steep incline it is advantageous if the suspension fork compresses such that the inclination angle of the rider or the bicycle is reduced. This enables the rider to move the overall center of gravity forward such that the feeling or the risk of a backwards roll-over is reduced.

To achieve compression of the suspension fork and prohibit subsequent decompression, it is possible in known suspension forks to activate a shut-off valve for locking the rebound stage so as to lock the fluid path in the rebound stage. Subsequently only compressing is enabled until the suspension fork has reached the maximum compressed state. By locking the rebound stage, rebound is effectively prevented.

By way of such activating of the shut-off valve for the rebound stage, the angle of the bicycle on a steep inline is effectively reduced. There is the drawback, however, that complete compression will also cause the trail angle and the steering angle to change greatly.

Against the background of the described prior art it is therefore the object of the present invention to provide a suspension fork allowing a defined compression of the suspension fork in steep uphill grades.

SUMMARY

The suspension fork according to the invention is provided to be used with a bicycle and comprises at least one stanchion tube and at least one slider tube interacting therewith and a wheel receiving space adjacent thereto. A damper system is provided with a damper chamber divided into a first chamber and a second chamber by means of a movable piston.

Furthermore, the suspension fork comprises a damping device for the rebound stage and at least one damping device for the compression stage. At least one shut-off valve is provided for selectively locking the rebound stage. The damper chamber comprises at least one connecting duct with a flow damper that connects the second chamber with the first chamber external of the movable piston when the stanchion tube and the slider tube interacting therewith are compressed by more than a predefined distance such that in the case of a forceful compression and with the shut-off valve of the rebound stage activated, slow decompression is allowed up to a damper position as defined by the predetermined distance.

The suspension fork according to the invention has many advantages. It is a considerable advantage of the suspension fork according to the invention that for rides uphill and steep inclines and other applications a defined compression of the suspension fork is allowed without which the suspension fork compresses entirely. Due to the connecting duct that opens as a predetermined compression is exceeded, fluid compensation may occur even if the shut-off valve for the rebound stage is activated.

Another considerable advantage is that the flow damper in the connecting duct only allows slow fluid compensation of the damping fluid such that rebound occurs slowly. In this way, it is ensured that in normal operation the connecting duct only slightly influences the springing and damping characteristics of the damping device for the rebound stage even in the case of forceful compression. In normal operation, the user does not become aware of compression occurring beyond the predetermined distance. Changes in the springing and damping characteristics virtually do not occur. Therefore the flow damper is dimensioned accordingly so as to provide slow decompression.

A considerable advantage of the suspension fork according to the invention is that independently of the weight of the rider the suspension fork will always be set in the same position even in the case of a locked rebound stage. This position is independent from the acting forces and it is only defined by the position of the connecting duct. This is very advantageous since in this way the same position is set for every rider which is very advantageous in particular in steep uphill rides.

Preferably, the flow cross-section of the flow damper of the connecting duct is smaller than half the maximum flow cross-section of the damping device for the compression stage.

Particularly preferably, the ratio of the flow cross-section of the flow damper to the maximum flow cross-section of the damping device for the compression stage is smaller than 1:5 and in particular smaller than 1:10 and particularly preferably smaller than 1:20.

Particularly preferably, the ratio of the flow cross-sections of the flow damper to the maximum flow cross-section of the damping device is smaller than 1:10 or 1:20 or even 1:30.

For example when the maximum flow cross-section of the damping device for the compression stage is 3 or 4 mm, then a diameter of the flow damper may for example be 0.5 mm or 1 mm or 1.5 mm. Due to the quadratic effect on the area, ratios between approximately 1:64 and 1:10 ensue. Larger and smaller ratios are also possible.

By way of the considerable difference between the flow cross-sections of the flow damper of the connecting duct and the maximum flow cross-section of the damping device, it is ensured that even in the case of a compression beyond the predetermined distance any changes in the damping properties of the suspension fork can virtually not be sensed.

Preferably, at least one damping device is configured as an adjustable damper valve and in particular as a low-speed damper valve. In this way, the damping characteristics in the rebound stage and in the compression stage can be adjusted accordingly.

Advantageously, a fixedly set high-speed damper valve is provided for rebound damping and/or compression damping to enlarge the cross-section for the damping fluid in the case of heavy impacts or shocks so as to provide kind of an adequate damping.

Preferred specific embodiments also provide a shut-off valve for the compression stage. By way of simultaneously activating a shut-off valve for the compression stage and a shut-off valve for the rebound stage, the suspension fork is virtually set rigid.

Preferably, the connecting duct comprises at least one overflow aperture, a duct or an annular gap, and an aperture. Preferably, the connecting duct is provided external of the damper chamber. Said overflow aperture connects the damper chamber with the duct or annular gap. An annular gap as the duct may for example extend around the damper chamber. The aperture in turn connects the connecting duct with the damper chamber at the end where the first chamber is disposed.

Now, when the movable piston is located between the aperture and the overflow aperture, then the connecting duct connects the first chamber with the second chamber so as to allow exchange of fluid.

Such exchange of fluids takes place slowly since a flow damper is provided in the connecting duct. The flow damper may be formed by one or more overflow apertures but it may as well be provided at the aperture at the other end of the connecting duct or else formed by the connecting duct per se. For example, the duct may be suitably small in cross-section so as to allow only slow exchange of damping fluid between the first chamber and the second chamber even if the connecting duct connects the first chamber with the second chamber.

Preferably, the duct or the annular gap is limited inwardly by means of an inner tube and outwardly, by means of a center tube. Said center tube is positioned inside the stanchion tube.

In preferred more specific embodiments, the connecting duct can be shut off. For example, a shut-off valve may be provided to shut off the connecting duct by way of external control.

Advantageously, the at least one slider tube is provided to be locked towards the stanchion tube in any desired compressed position beneath the damper position defined by the predetermined distance. This may occur for example by way of activating both the shut-off valve for the rebound stage and the shut-off valve for the compression stage. If the damper position is so as to not exceed the predetermined distance of compressing, then a rigid suspension fork is provided in this position. Only when compression exceeds the predetermined distance can exchange of damping fluid take place through the connecting duct such that over time the damping position approximates the defined damper position.

In advantageous more specific embodiments, the predetermined distance amounts to between approximately 20 percent and 50 percent of the maximum spring travel. This allows to achieve an advantageous position of the suspension fork in which the inclination angle of the bicycle is considerably reduced which may be advantageous in riding uphill.

In preferred more specific embodiments, the damper system comprises a control section at and in particular inside a stanchion tube which control section is positioned above the first chamber and the first chamber is positioned above the second chamber. By way of a damper system positioned at or in the vicinity of the upper end of the stanchion tube, a simple structure of the suspension fork according to the invention is possible since the positioning of the damping device and the shut-off valves at the control section allows easy accessibility of each of the valves. In this way, the control section may be provided with all of the adjusting elements which may be operated by the rider during a ride if and as required.

Preferably, a joint adjusting element is provided with which to adjust or activate the shut-off valve of the rebound stage and the shut-off valve of the compression stage. Preferably, the joint adjusting element is positioned at the slider tube or the fork crown where it is in particular pivotally attached. This allows the rider to bend forwardly during a ride and to actuate the joint adjusting element at the stanchion tube or the fork crown to carry out the desired adjustments.

Optionally, the joint adjusting element may be provided to be remotely controlled, being operated by means of an electric control element or a lever at the handlebar or the like.

For all of the configurations, it is particularly preferred for the movable piston to be connected with the slider tube via a piston rod wherein the slider tube is in particular provided with the dropout to receive a wheel.

The slider tube or slider tubes and the stanchion tube or stanchion tubes may consist of a metal and in particular a light metal. It is also possible to employ fibrous composite materials. In a specific embodiment, the stanchion tubes consist of metal at least in part and the slider tubes consist of a fibrous composite material at least in part. This allows a design both sturdy and lightweight.

In all the configurations, the suspension fork is preferably configured in right-side-up structure in which two stanchion tubes affixed on the fork bridge of the suspension fork are provided which plunge into two corresponding larger-diameter slider tubes. Employing with other suspension forks according to a different construction principle is possible as well.

In all the configurations and more specific embodiments, the slider tubes are preferably provided for a sliding contact with the stanchion tubes of the suspension fork. Preferably, the stanchion tubes are supported in the slider tubes by means of slide bearings.

Preferably, the lower end of at least one slider tube is provided with a wheel receiving device or a dropout which is in particular provided to receive a wheel.

It may also be employed with one stanchion tube and one slider tube only.

Preferably, the lower end of at least one slider tube is provided with a dropout which is in particular provided to receive a wheel.

BRIEF DESCRIPTION OF THE DRAWINGS

Further advantages and applications of the present invention ensue from the description of exemplary embodiments which will now be discussed with reference to the enclosed figures.

DETAILED DESCRIPTION

In FIGS. 1 to 13, a first embodiment of the suspension fork 1 according to the invention is illustrated in views some of which are highly schematic. For better clarity and to better explain the function, some parts and components have been omitted.

Figure 1:
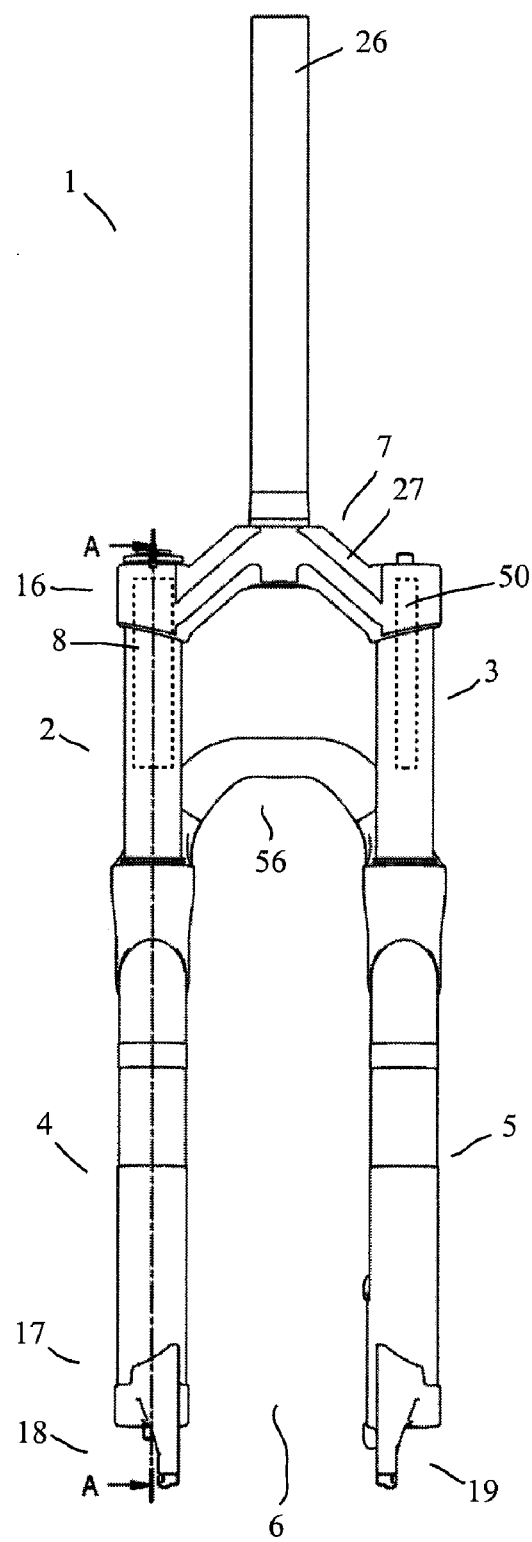
FIG. 1 is a front view of a suspension fork according to the invention.

The suspension fork 1 illustrated in FIG. 1 comprises in its upper region a fork column 26 that is centrally attached to a connector 7 configured as a fork crown 27 to rotatably attach the fork to the bicycle frame.

The two ends of the fork crown 27 respectively have stanchion tubes 2 and 3 affixed to the fork crown 27. A damper system 8 is disposed in stanchion tube 2 and a suspension system 50 is provided in stanchion tube 3. It is also conceivable to incorporate the damper system 8 and also the suspension system 50 in a stanchion tube 2 or 3. By means of the damper system 8 and the suspension system 50, the suspension fork 1 is provided with the desired springing and damping properties.

A slider tube unit is displaceably provided at the stanchion tubes 2 and 3, comprising slider tubes 4 and 5 connected with one another through at least one connecting bracket 56. The slider tube unit may consist of several component parts but it may as well be manufactured integrally.

A wheel receiving space 6 is provided between the pair of slider tubes 4 and 5 or between the stanchion tubes 2 and 3. A wheel, presently not shown, may be attached to the dropouts 18 and 19 of the slider tubes 4 and 5 at the lower end 17 of the suspension fork 1.

Figure 2:
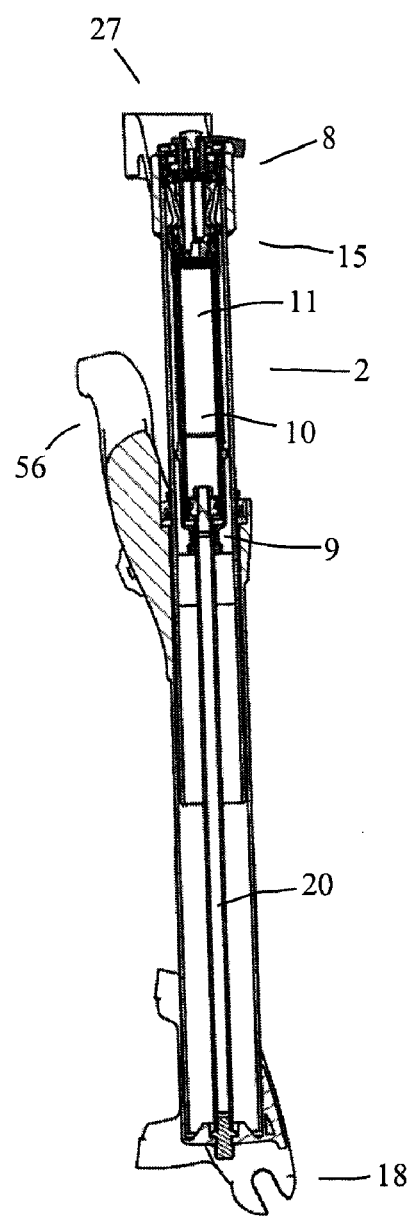
FIG. 2 is a cut side view along A-A of the suspension fork in FIG. 1.

At the upper end 16 a damper system 8 is incorporated in the stanchion tube 2, as illustrated in FIG. 2.

The damper system 8 comprises a damper chamber 10 divided into an upper, first chamber 11 and a lower, second chamber 12 by means of a movable piston 9. Above the damper chamber 10, a control section 15 is provided which concurrently forms the top end of the damper chamber 10. The movable piston 9 is presently configured as a closed pump plunger where flow through the movable piston 9 is not possible. When the piston is moved, external return flow must occur from the upper or first damper chamber 11 to the lower or second damper chamber 12.

While the damper chamber 10 with the first chamber 11 and the second chamber 12 are configured as a high pressure chamber 29, the control section 15 is provided with a low pressure chamber 32.

A damping device 57 for rebound damping and a damping device 58 for compression damping are provided in the control section 15. Presently, the damping device 57 is provided as an adjustable damper valve 13 for adjusting the rebound stage damping. The damping device 58 is provided as an adjustable damper valve 14 for adjusting the compression stage damping. Furthermore, the suspension fork includes a shut-off valve 24 for the rebound stage, a shut-off valve 25 for the compression stage, and high-speed damper valves 22, 23 for the rebound stage and the compression stage and a blow-off valve 48.

At the upper end of the first chamber 11 of the damper chamber, a check valve 51 is provided which by means of a spring (not shown) is preloaded in a closed position in which the check valve 51 closes the direct flow connection with the low pressure chamber 32. The check valve 51 opens as the first chamber has a relative negative pressure in the rebound stage (see FIG. 6).

A check valve 52 is provided which is preloaded in closed position by means of a spring that is not shown in detail. The check valve 52 opens as the second chamber 12 has a relative negative pressure in the compression stage (see FIG. 5) and the damping fluid is sucked from the low pressure chamber 32 through the return channel 35 and the external chamber 31 into the second chamber 12.

In the rebound stage, the damping medium supplied to the riser 34 from the return channel 35 is introduced into the low pressure chamber 32 through the damper valve 13. In the case of the compression stage, the damping medium introduced into the duct riser 33 from the first chamber 11 is introduced into the low pressure chamber 32 through the damper valve 14. Then in the compression stage, the damping fluid enters from the first chamber 11, which forms part of the internal chamber 30, through the riser 33 into the control section 15. Depending on the position of the damper valve 14 and after application of a load, the damping fluid is introduced through the damper valve 14 and/or through the high-speed damper valve 23 into the low pressure chamber 32.

In the case of the rebound stage, the damping fluid enters from the second chamber 12 in the lower region of the damper system 8 into the external chamber 31 which is configured as a high pressure chamber and confined in the lower region 36 of the second chamber 12 by the external wall of the stanchion tube 2 and by a center tube 37 which radially encloses the stanchion tube 2 in the lower region 36 of the second chamber 12. In this way, a thermal insulation is achieved from the slider tube 4 which encloses the stanchion tube 2 in the lower region 36 of the second chamber 12 so as to largely prevent the slider tube 4 from heating in the lower region.

In relation to the loads occurring, the movable piston 9 slides upwardly and downwardly inside the damper chamber 10 wherein radially outwardly sealing against the internal chamber 30 occurs through a seal 49.

The damper valves 13 and 14 in the present embodiment are disposed displaceably via adjusting elements 21. The adjusting elements 21 may be configured as screw heads 28 wherein rotating the adjusting element 21 inserts the respective damper valve 13 or 14 further into the top end wall of the control section 15. In this way, slots or radial bores 54 and/or 55 through which the damping oil is directed in the compression stage or the rebound stage, are widened or narrowed. In this way, via rotational movement of the adjusting elements 21 of the damper valves 13 and 14, an efficient adjustment of the damping effect of the rebound stage and the compression stage is possible separate from one another. This adjustment of the damping effect occurs for normal operation in which the suspension fork is adjusted for damping small, medium or heavy impacts.

To ensure damping including in the case of particularly heavy impacts, the high-speed damper valves 22 and 23 are provided for the rebound stage or the compression stage respectively. Although the high-speed damper valves 22 and 23 are as a rule not provided to be adjustable, this is possible as well.

In the present embodiment, preloading devices are provided which are for example configured as coil springs so as to preload the respective high-speed damper valves 22 and 23 in the closed position. Now, as particularly large impacts occur the pressure in the damper chamber rises correspondingly such that the force of the respective preloading devices is overcome and the respective high-speed damper valve 22 or 23 opens. This will cause the valves to open in the case of sufficiently forceful loads.

Figure 3:
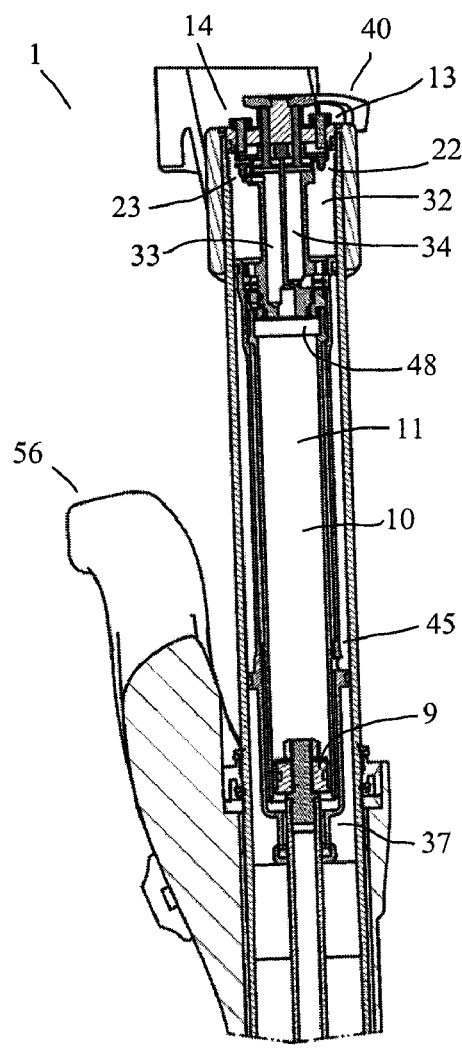
FIG. 3 is an enlarged, cut side view of the suspension fork in the compression stage.
Figure 4:
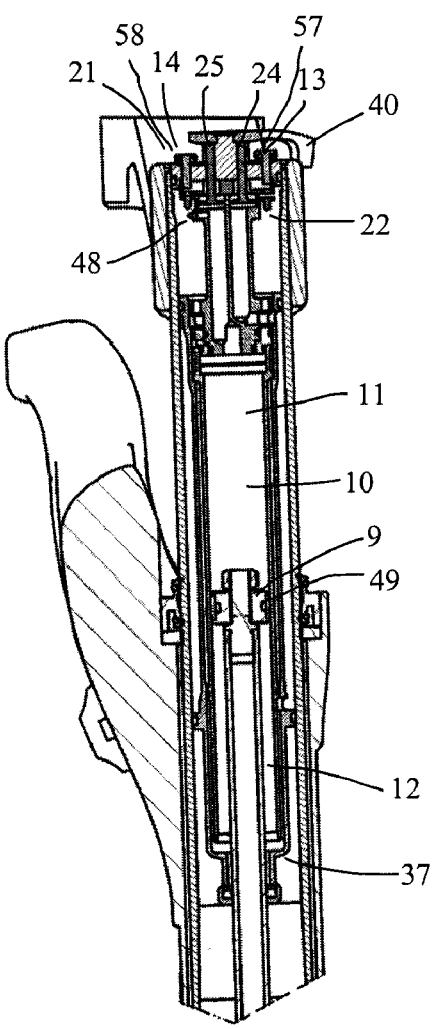
FIG. 4 is a cut side view of the suspension fork in the rebound stage.
Figure 5:
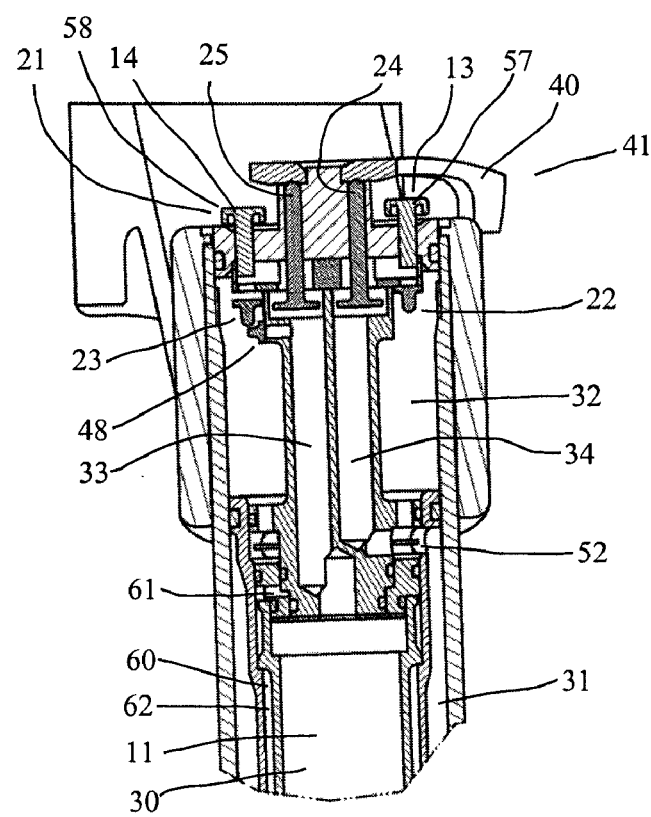
FIG. 5 is an enlarged view of the control section of the damper system of the suspension fork in FIG. 3 in the compression stage.
Figure 6:
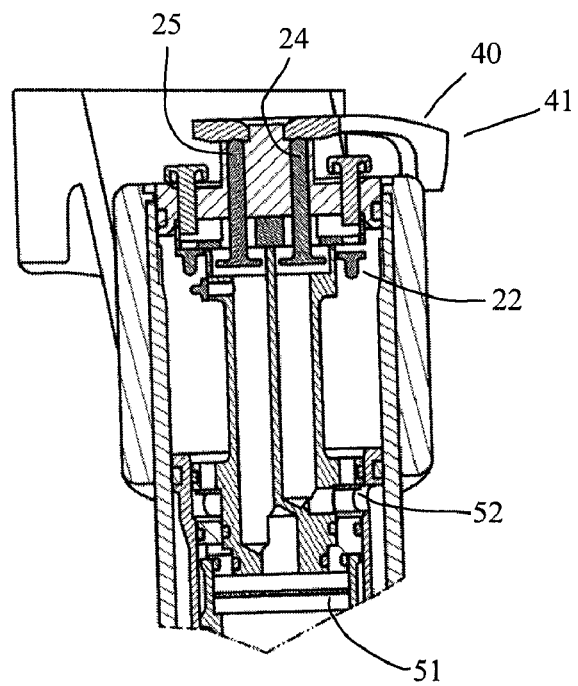
FIG. 6 is an enlarged view of the control section of the damper system of the suspension fork in FIG. 4 in the rebound stage.

FIG. 3 shows compressing in the compression stage while FIG. 5 shows the positions of each of the valves in enlarged illustration. FIG. 4 shows decompressing in the rebound stage while FIG. 6 shows enlarged illustrations of the valve positions.

It can clearly be seen in FIGS. 3 to 6 that both the shut-off valves 24 and 25 are open while the damper valves 13 and 14 are illustrated open or closed, depending on the operating condition.

As can in particular be taken from the illustration in FIG. 3, an overflow aperture 45 is located at the distance 46 from the lower end of the damper chamber 10 so as to allow the damping fluid to exit from the second chamber 12 even if the shut-off valve 24 for the rebound stage is closed until the piston 9 closes the overflow aperture 45, presently from above.

The shut-off valves 24 and 25 for the rebound stage and the compression stage serve to selectively prohibit damping in the rebound stage or in the compression stage. Damping may be prohibited by activating either of the valves such that the flow passage either for the rebound stage or the compression stage closes.

It is a considerable advantage of the illustrated embodiment that one single adjusting lever 40 is provided as the adjusting element 21 with which to intentionally and selectively jointly activate both the shut-off valve 24 of the rebound stage and the shut-off valve 25 of the compression stage.

To this end, the adjusting lever 40 is pivotally disposed at the upper end 16 of the control section 15 such that the adjusting lever 40 presently projects from the upper end of the stanchion tube 2 and can be actuated by the rider while the operator is riding. All the rider needs to do is move one hand down to the fork crown 17 of the fork 1 and then by way of rotationally moving the adjusting lever 40, he can shift between presently three to four shift stages. In a preferred configuration, the adjusting lever 40 may be configured as a remotely controlled adjusting element actuated e.g. by a control mechanism at the handlebar.

In a first setting or first position 41 of the adjusting lever 40 shown in FIG. 5, both the shut-off valve 24 of the rebound stage and the shut-off valve 25 of the compression stage are not activated so as to allow free flow through the valves 24 and 25. This is the standard operating condition of the suspension fork 1 in which both a rebound damping and a compression damping and compression and decompression are possible.

Figure 7:
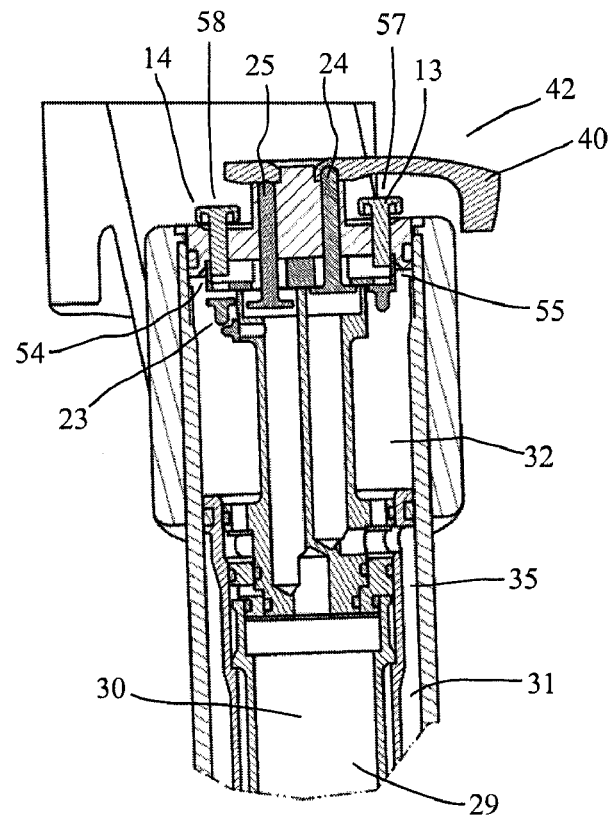
FIG. 7 is the control section of the damper system of the suspension fork in FIG. 1 with the adjusting lever in the first shift stage.

By way of rotational movement of the adjusting lever 40 from the first position 41 to the second rotational position 42 as illustrated in FIG. 7, the shut-off valve 24 of the rebound stage is activated and thus closed such that in the rebound stage flow-through is substantially disabled. In the compression stage the shut-off valve 25 is still open. This means that compression is still possible while subsequent rebound is prohibited. Such a rotational position 42 of the adjusting lever 40 makes sense for example when the rider climbs a steep incline and wishes to reduce the inclination angle of the bicycle. By means of the front wheel fork compressing, its effective height decreases so that a safe and comfortable riding position is achieved. After activation of the pivot position 42 by the adjusting lever 40 being rotated, every impact and every compression causes the front wheel fork to lower until a pre-determined setting is reached.

Figure 8:
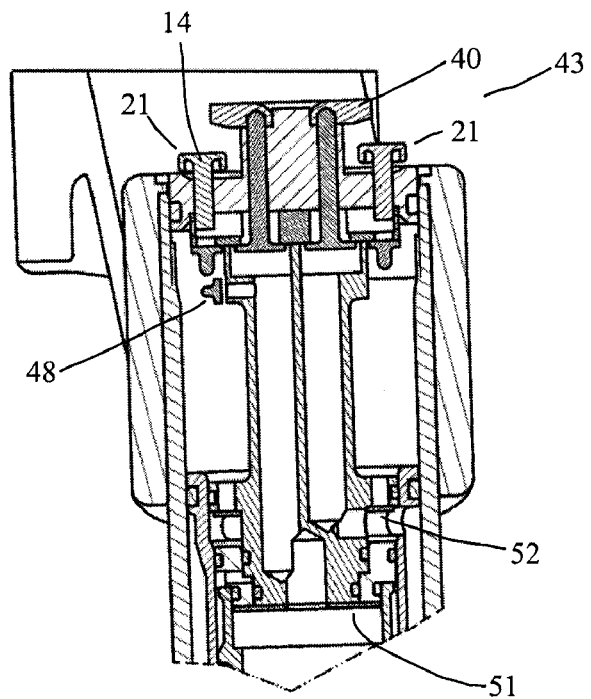
FIG. 8 is the control section of the damper system of the suspension fork in FIG. 1 with the adjusting lever in the second shift stage.

By way of rotating the adjusting lever 40 further into a third shift position 43 illustrated in FIG. 8, both the shut-off valve 24 for the rebound stage and the shut-off valve 25 for the compression stage are closed. Adjusting the adjusting lever 40 in this way is possible at any time. In this way, both decompression and compression of the fork is prohibited. The suspension fork 1 practically behaves as if no suspension and damper system are present. Only in the case of particularly heavy impacts the blow-off valve 48 can be activated, allowing flow-through so as to limit the maximum pressure occurring in the system and to prevent the damper system 10 of the suspension fork from being damaged or from breaking, for example if the rider jumps with his bicycle while the adjusting lever is in the third shift position 43.

It may further be possible to shift the adjusting lever 40 to a fourth shift position 44 in which the shut-off valve for the compression stage is closed while the shut-off valve 24 for the rebound stage is open. In this way, decompression of the spring is allowed while compression is prohibited.

The suspension fork 1 furthermore comprises the overflow aperture 45 indicated above which is provided at a distance 46 from the lower end of the first chamber 12. By means of the overflow aperture 45 the suspension fork 1 is prevented from compressing completely if the shut-off valve 24 of the rebound stage is activated.

A connecting duct 60 is provided in which at least one flow damper 63 is provided. The connecting duct 60 serves to allow the suspension fork to slowly, automatically rebound back to a specific measure when the shut-off valve 24 of the rebound stage is activated after heavy compressions.

To this end, the connecting duct 60 provides a flow connection for the damping fluid between the second chamber 12 and the first chamber 11 as the stanchion tube 2 and the slider tube 4 cooperating therewith have compressed by more than a specified distance 46. In this way, in the case of forceful compression and with the shut-off valve 24 of the rebound stage activated, slow decompression is allowed up to a damper position 68 as defined by the predetermined distance 46.

Figure 9:
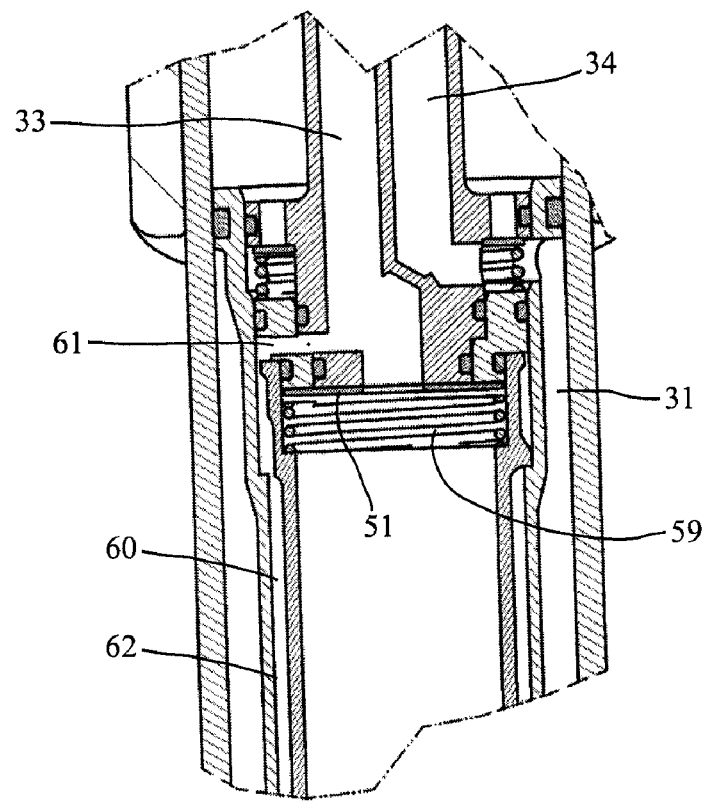
FIG. 9 is an enlarged cross-section of a stanchion tube in the upper region.
Figure 10:
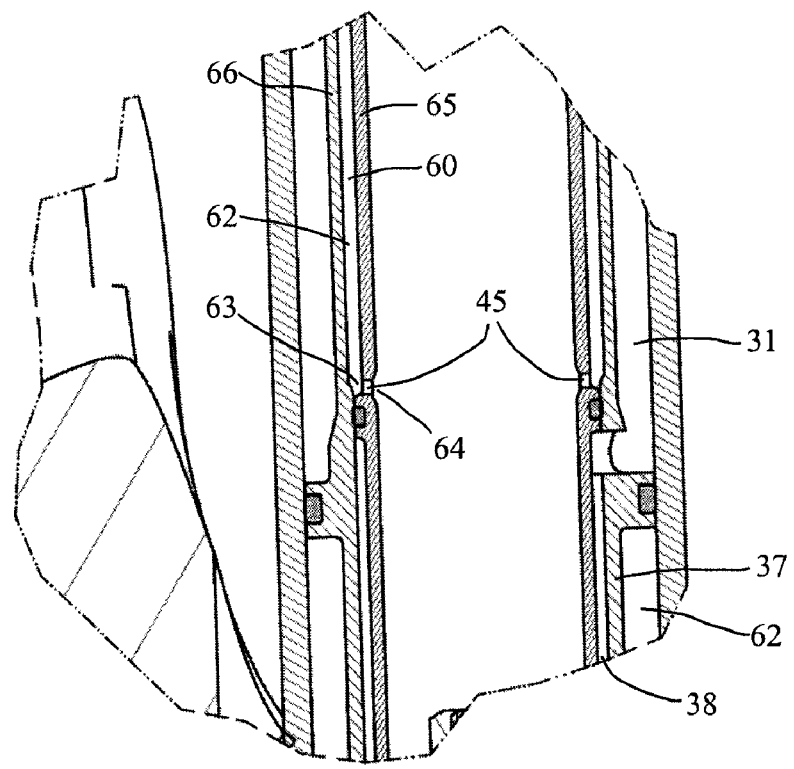
FIG. 10 is an enlarged cross-section of a stanchion tube in the region of the overflow aperture.

The configuration of the overflow valve or the overflow aperture 45 is illustrated in FIGS. 9 and 10. In the range between approximately 20 and 50% of the compression travel at least one overflow aperture 45 is provided at the damper chamber 10. The overflow aperture 45 is located at the distance 46 from the bottom while the maximum stroke corresponds to the length 47. Presently, the at least one overflow aperture 45 is connected with the aperture 61 via the duct formed as an annular duct 62 and presently opens into the riser 33. In this way, damping fluid can immediately flow from the chamber 12 into the riser 33 and thus return into the chamber 11. The damping fluid can pass from the chamber 12 via the overflow aperture 45 into the duct 60 and further through the aperture 61 into the riser 33 and into the first chamber 11 such that the suspension fork rebounds until the piston closes the overflow aperture 45 again.

The flow damper 63 is presently formed by the overflow aperture 45 or by the overflow apertures 45, if several are present. The flow cross-section 64 of the flow damper 63 is formed by the clear passage area of the overflow aperture 45 (or by the sum of the areas of each of the overflow apertures 45). At any rate, the flow cross-section 64 is presently substantially smaller than half the maximum flow cross-section of the damping device 58 or the damper valve 14 for the compression stage.

The ratio of the flow cross-section 64 of the flow damper 63 to the maximum flow cross-section of the damping device 58 for the compression stage is in particular smaller than 1:3 and preferably smaller than 1:5 and particularly preferably smaller than 1:8. Values of 1:10 or 1:20 and in particular 1:30 are conceivable and preferred. The area is in particular dimensioned such that the connecting duct 60 when open only slightly influences the damping reaction of the suspension fork.

The same preferably applies to the ratio of the flow cross-section 64 of the flow damper 63 to the maximum flow cross-section of the damping device 50 for the rebound stage.

The annular gap 62 is confined by an internal tube 65 and a center tube 66 both of which are positioned concentrically inside the stanchion tube.

In other configurations, the connecting duct can be shut off e.g. via a controllable valve.

In other configurations, the duct 60 may open immediately into the low pressure chamber 32 through an aperture 61 (variant not illustrated). Thus, a suspension fork can be adjusted to different operational modes. For example, the suspension fork may be adjusted to be entirely rigid or compressed a specific amount e.g. for riding up-hill.

The function and mode of operation of the overflow valve 45 will now be explained with reference to FIGS. 11 to 13.

Figure 11:
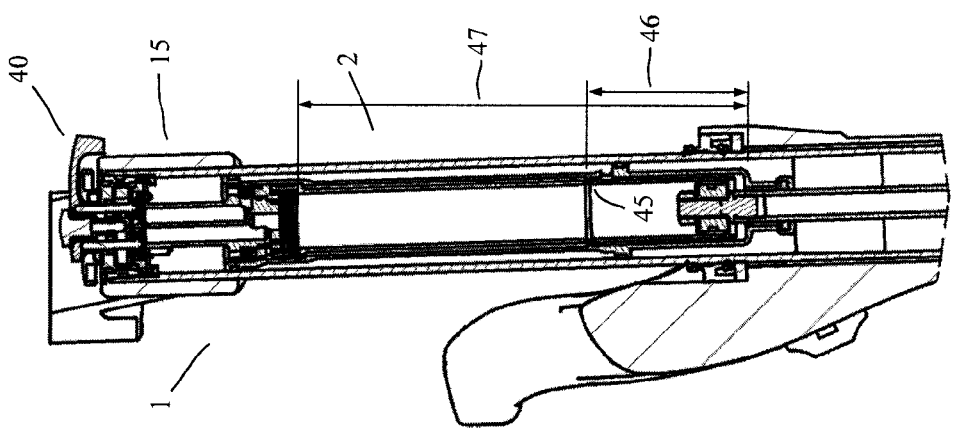
FIG. 11 is the suspension fork of FIG. 1 with the rebound stage locked in compressing.

In the illustration of FIG. 11 the suspension fork 1 is in the rebound state with the shut-off valve 24 of the rebound stage activated to allow the suspension fork 1 to compress while rebound is substantially prohibited.

After activating the shut-off valve 24 by displacing the adjusting lever 40 to the second shift position 42, the riser 34 is closed for the rebound stage. The impacts occurring during the ride cause the suspension fork 1 to lower until the suspension fork has reached, for example, the position shown in FIG. 13 in which the piston 9 is compressed down to the overflow aperture 45.

Figure 12:
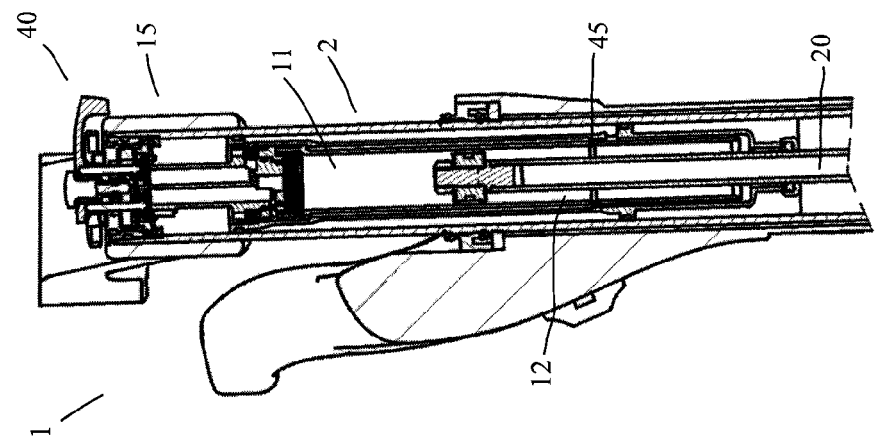
FIG. 12 is the suspension fork of FIG. 1 with the rebound stage locked after intense compression.

Now, when another heavy impact acts on the suspension fork 1 in this position, the suspension fork is compressed further beyond the overflow aperture 45 (see FIG. 12). Thus, the overflow aperture 45 is opened such that the locking action of the shut-off valve 24 is bypassed. The connecting duct 60 connects the second chamber 12 with the first chamber 11 and the suspension fork is automatically slowly lowered. The exchange of the damping fluid occurs slowly because the flow cross-section 64 of the overflow aperture 45 serving as the flow damper 63 is small.

Figure 13:
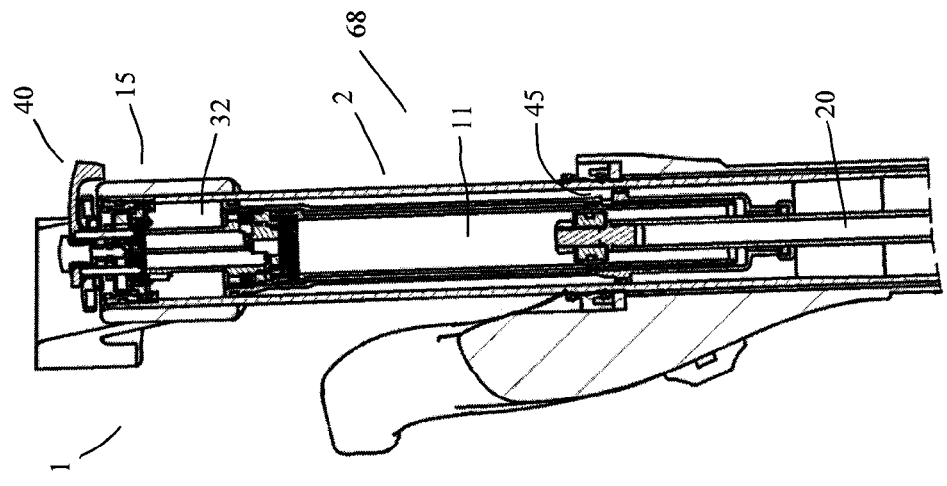
FIG. 13 is the suspension fork of FIG. 1 with the rebound stage locked and subsequent slow decompression.

The overflow aperture 45 enables the suspension fork 1 to rebound back until the condition shown in FIG. 13 is achieved in which the overflow aperture 45 is closed again.

On the whole, a system is provided by means of the overflow aperture 45, the activated shut-off valve 24 notwithstanding, so as to limit the suspension travel even if the shut-off valve 24 of the rebound stage is activated. By way of disposing the overflow aperture 45, the desired suspension travel can be adjusted.

In this way, a function is provided which in up-hill rides provides the required compression while on the other hand a small damping function continues to be available.

With several adjustable or shiftable overflow apertures 45 provided at different heights, the suspension travel still available with the shut-off valve 24 activated can be adjusted correspondingly.

Figure 14:
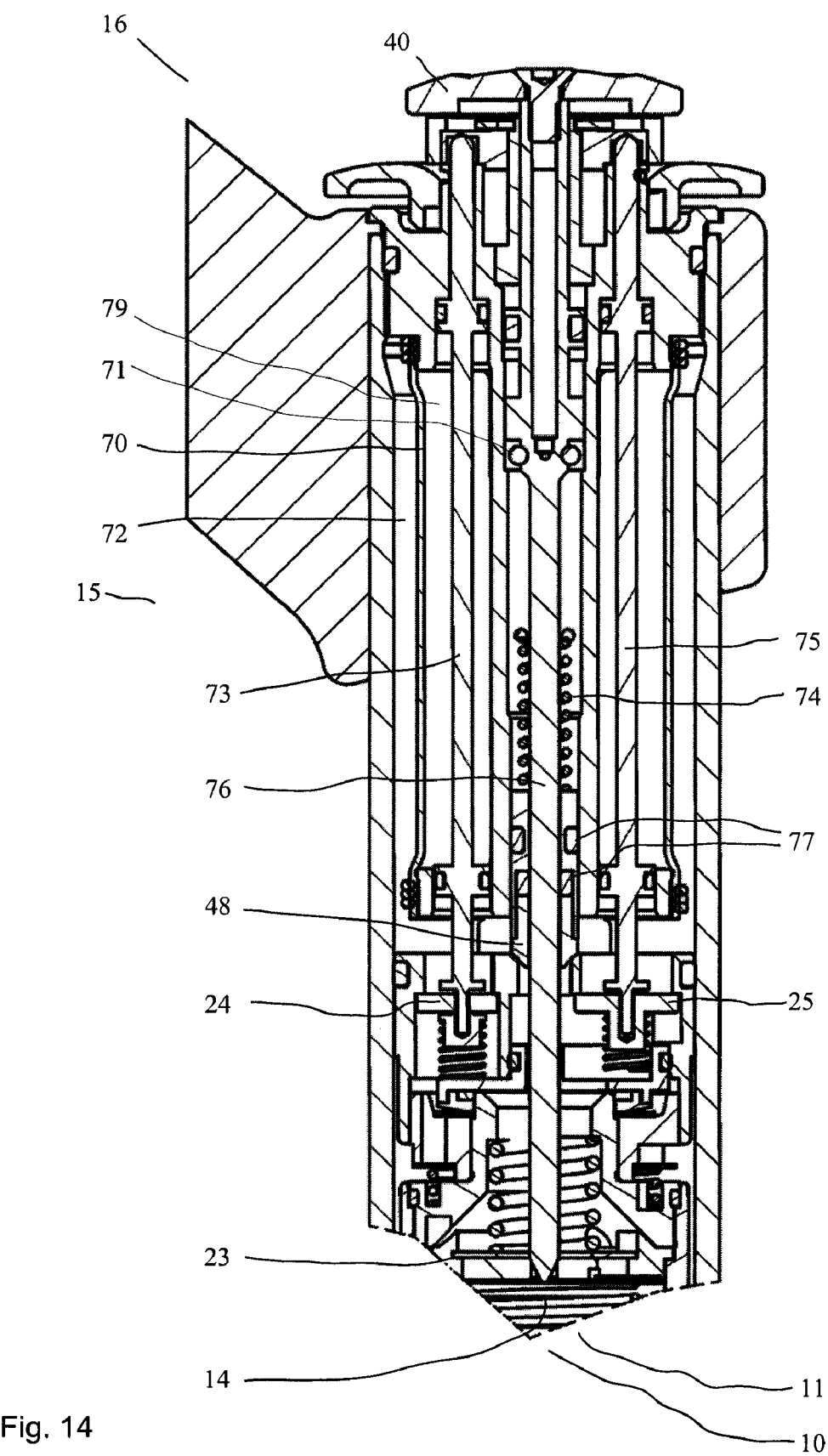
FIG. 14 is an enlarged illustration of a cross-section of the control section of another suspension fork.
Figure 15:
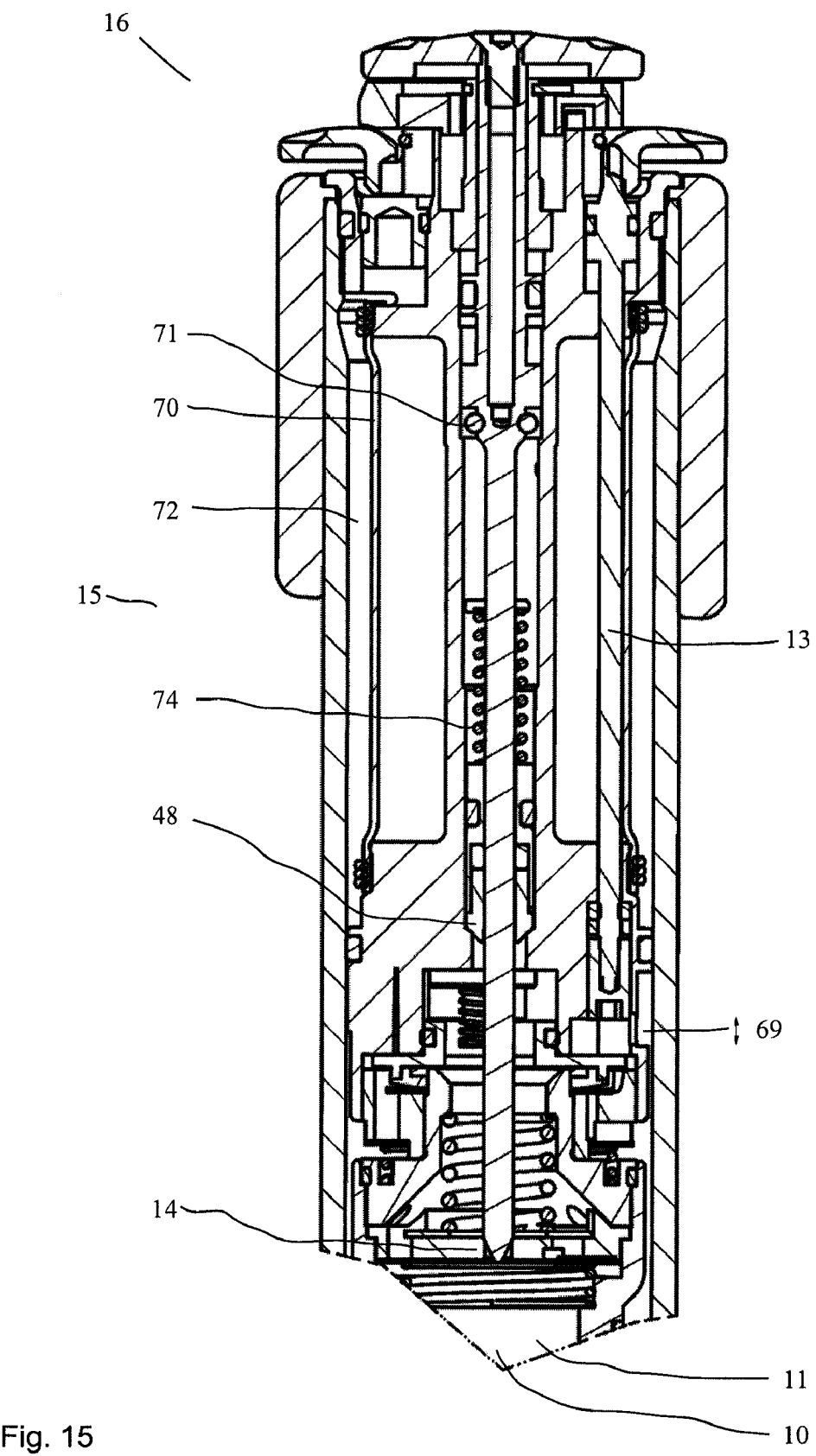
FIG. 15 is another cross-section of the control section of the suspension fork according to FIG. 14.
Figure 16:
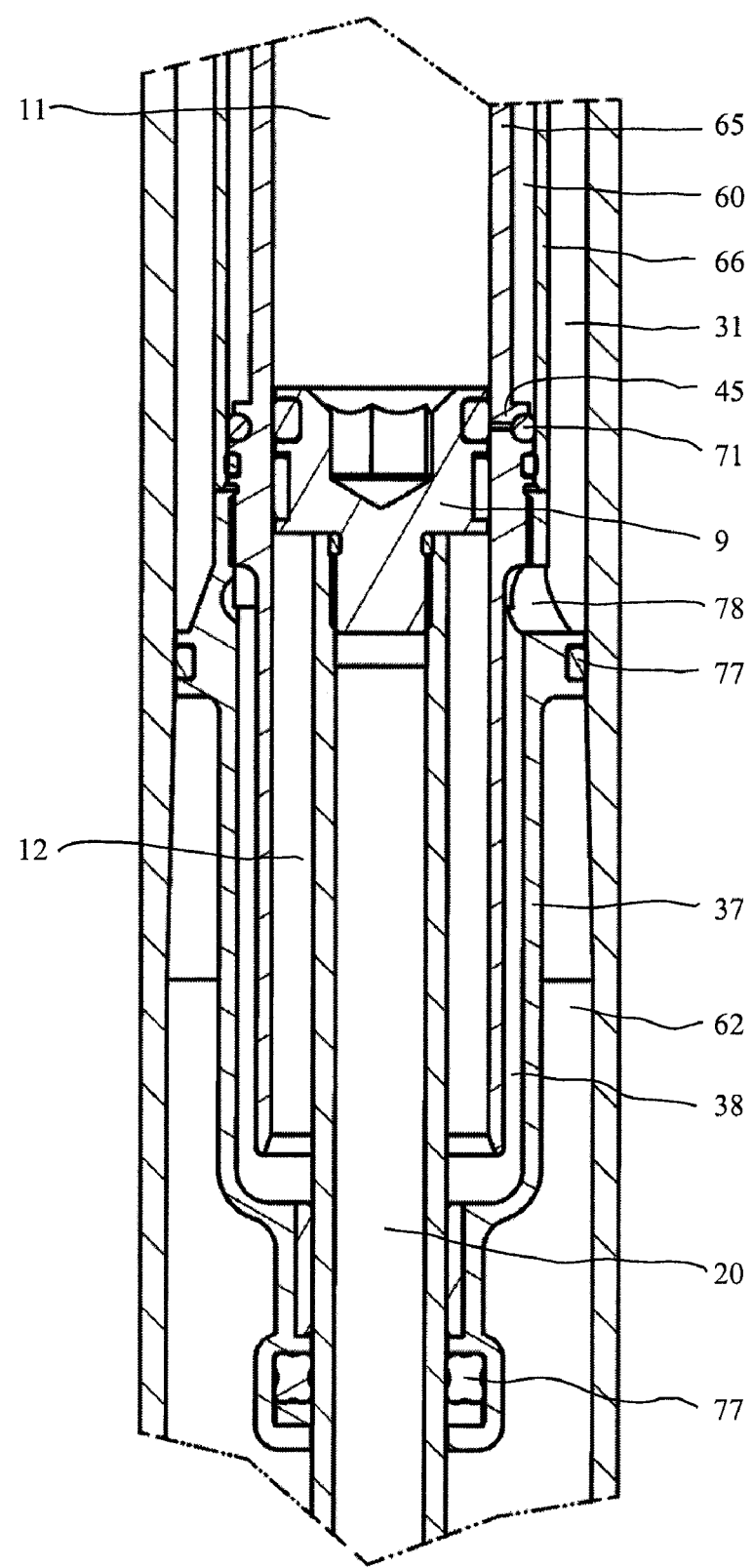
FIG. 16 is an enlarged cross-section of the suspension fork according to FIG. 14 with the movable piston.

FIGS. 14 to 16 show cross-sections of another embodiment of a suspension fork 1 according to the invention. Like or similar parts are provided with the same reference numerals. The damper system 8 in turn is inserted in a stanchion tube 2 or 3 of a suspension fork 1, as shown in FIG. 1.

Unlike the preceding embodiment, the embodiment according to FIGS. 14 to 16 provides for the damper valve 13 to be a low-speed damper valve for the rebound stage at the top end of the damper chamber 10. The damper valve 14 as a low-speed damper valve for the compression stage is likewise disposed at the top end of the damper chamber 10. The valves separate the high pressure region from the low pressure region. The control section 15 virtually extends from the upper end of the first chamber 11 to the upper end 16 of the stanchion tube 2.

The damper valves 13 (low-speed) for the rebound stage and 14 (low-speed) for the compression stage are connected with the upper end 16 through corresponding control elements or control pins and they are adjustable by way of actuating the adjusting element 40.

In FIG. 14 it can be seen that the control pin 73 acts on the shut-off valve 24 for the rebound stage such that lockout may be activated as needed and rebound damping, may be locked. Another control pin 75 acts on the shut-off valve 25 for the compression stage and it may selectively lock compression damping. In the case of particularly forceful shocks the blow-off valve 48 opens if the shocks generate a force exceeding the interior force of the spring 74 of the blow-off valve 48.

The blow-off valve 48 is sealed by means of seals 77 both relative to the control pin 76 and to the external wall. The high-speed damper valve 23 is presently connected in parallel to the low-speed damper valve 14.

Above the shut-off valves 24 and 25, the oil compensation chamber 72 is separated from a gas volume 79 by means of a partition wall. The partition wall is presently configured as a rubber hose 70, ensuring reliable separation of the oil from the gas volume. The gas volume 79 is under excess pressure of typically between 1 and 5 bar. The movable piston 9 is presently configured as an impermeable pump plunger. When the movable piston 9 plunges, the volume available to the oil is reduced. In this way the gas volume 79 compresses by means of the flexible rubber hose 70 and the compensation chamber 72 expands correspondingly.

The O-ring 71 covers a bore. The O-ring 71 together with the bore serves as a one-way valve and serves for filling up the suspension fork with gas after mounting. The one-way valve opens as the internal pressure expands the O-ring far enough for gas to exit through the gap generated.

FIG. 15 shows another cross-section of the control section 15 wherein FIG. 15 shows a cross-section approximately transverse to the cross-section according to FIG. 14.

One can see the damper valve 13 as a low-speed control valve for the rebound stage. By way of longitudinal adjustment the regulating gap 69 is regulated and thus the flow resistance is adjusted.

FIG. 16 shows a cross-section of the region of the piston in the lower region of the damper chamber, where as in the preceding embodiment the overflow aperture 45 is provided.

The piston rod 20 is sealed by way of a seal 77 against the damper chamber 10. At the upper end of the piston rod 20, the movable piston 9 is provided that is configured as a pump plunger and that separates the first chamber 11 from the second chamber 12.

At its bottom, the second chamber 12 makes a transition to the interspace 38 connected therewith. The second chamber 12 or the low-pressure region is limited externally by the center tube 37 that is sealed externally by means of a seal 77 towards the stanchion tube. At its upper end, the interspace 38 is radially outwardly connected with the external chamber 31 through at least one aperture 78. The second chamber 12 together with the interspace 38 and the external chamber form the rebound stage chamber.

Positioned radially within the external chamber 31, the center tube 66 is provided in which the inner tube 65 is positioned concentrically. Between the inner tube 65 and the center tube 66 a duct 60 is provided. From the duct 60, an aperture 61 opens into the first chamber 11 in an upper region and an aperture 45 into the damper chamber 10, in a lower region. In this way, the duct 60 acts as a bypass between the first chamber 11 and the second chamber 12 when the movable piston 9 is located between the apertures 45 and 61. In this way, compensation is possible even in the case of a locked damping. Compensation occurs slowly since the flow cross-sections of the apertures are intentionally small.

To still further reduce the flow-through quantities through the overflow apertures 45 and 61, O-rings 71 may be provided across the overflow apertures 45 and 61. In this way, a specific pressure must first be overcome which further slows down the flow and thus inhibits normal function as little as possible. It has been shown that the overflow apertures 45 and 61 ought to be very small. And even in the case of small apertures, it makes sense to further reduce flow-through.

Another considerable advantage of the overflow apertures 45 and 61 and the bypass thus provided is that independently of the weight of the rider the same position will always be adjusted even in the case of a locked rebound stage. This position is independent of the acting forces and it is defined by the position of the bore. This is very advantageous since in this way the same position is set for every rider which is very advantageous in particular in steep uphill rides.

The function will now be described briefly: In the compression stage, i.e. during compression and with the shut-off valves 24 and 25 opened.

Following a shock, the movable piston 9 configured as a pump plunger moves upwardly and the pressure in the first chamber 11 above the piston 9 increases. Then the oil will flow upwardly through the damper valve 14 (compression stage valve low-speed).

The damper valve 23 is preloaded by a spring such that in the case of small loads a shim seals the damper valve 23. From a specific load or from a corresponding excess pressure onwards, the high-speed damper valve 23 of the compression stage opens such that the damper valves 14 and 23 are opened in parallel. The oil flows upwardly into the oil compensation chamber 72 at the upper end of the stanchion tube. The oil compensation chamber 72 configured as an annular chamber is formed between the stanchion tube wall and the flexible rubber hose 70. The rubber hose 70 compresses by way of the oil flowing into the oil compensation chamber 72. In the interior of the rubber hose 70, a gas volume 79 is present. The gas volume 79 is presently filled with air and in the present case under a pressure of e.g. 3-4 bar. In this way, any cavitation in the flowing oil is avoided. By way of the rubber hose and the gas volume, the volume of the piston rod is compensated. And, for thermal expansion of the oil a suitable reservoir is provided.

During compressing, the pressure concurrently decreases in the second chamber 12 below the movable piston 9. At its bottom the second chamber is in flow connection with the interspace 38 and the external chamber 31, from where oil is now drawn. The external chamber 31 abuts the control section 15. A return flow valve opens there and oil flows out of the oil compensation chamber 72 from above.

In rebounding in the rebound stage, the movable piston 9 moves downwardly and excess pressure forms in the lower, second chamber 12 and thus also in the external chamber 31 while negative pressure forms in the first chamber 11 above the piston 9.

By way of the negative pressure in the first chamber 11, at least one check valve positioned at the upper end opens, and oil is drawn from above from the oil compensation chamber 72.

On the whole, the suspension fork 1 according to the invention provides a system which allows high heat dissipation in the upper region of the stanchion tubes 2, 3 wherein all the operating elements 21, 40 can be flexibly arranged in an upper region 16 of the stanchion tubes 2 and 3.

In all the embodiments at least one shut-off valve 24 or 25 and/or at least one damper valve 13 or 14 may be actuated or activated electrically or magnetically. A remotely controlled construction is in particular possible and preferred. Operating is e.g. possible from the handlebar. A mechanical remote control is also preferred.

Furthermore the damper valves 13, 14, 22-25 are also located in the upper region 16 of the stanchion tubes 2 or 3 and via a shared adjusting lever 40 provided at the fork crown 27 or at the stanchion tube 2, 3, both a rebound stage lockout (locked rebound stage shut-off valve) and a compression stage lockout (locked compression stage shut-off valve) may be set such that the fork 1 is rigid both in the compressing direction and in the decompressing direction. At the same time a damping function can be ensured via an overflow valve 45 even with the rebound stage lockout activated.

The invention claimed is:

1. A suspension fork for a bicycle, comprising: at least one stanchion tube and at least one slider tube interacting therewith and a wheel receiving space adjacent said at least one stanchion tube and said at least one slider tube, said at least one stanchion tube including a damper system having a damper chamber divided into a first chamber and a second chamber by a movable piston, wherein at least one damping device for a rebound stage, at least one damping device for a compression stage and at least one shut-off valve for selectively locking the rebound stage are provided, wherein the damper chamber comprises at least one connecting duct with a flow damper that connects the second chamber with the first chamber external of the piston when the stanchion tube and the slider tube interacting therewith are compressed by more than a predetermined distance such that in the case of a forceful compression and with the shut-off valve of the rebound stage activated, slow decompression is allowed up to a damper position as defined by the predetermined distance.

2. The suspension fork according to claim 1, wherein a ratio of a flow cross-section of the flow damper to a maximum flow cross-section of the damping device for the compression stage is less than 1:5.

3. The suspension fork according to claim 1, wherein said at least one damping device is an adjustable damper valve.

4. The suspension fork according to claim 1, further comprising a fixedly set high-speed damper valve for at least one of rebound damping and compression damping.

5. The suspension fork according to claim 1, further comprising a shut-off valve for the compression stage.

6. The suspension fork according to claim 1, wherein the connecting duct comprises at least one of an overflow aperture, a duct or an annular gap and an aperture.

7. The suspension fork according to claim 6, wherein said duct or said annular gap is confined by an internal tube and a center tube that is disposed inside the stanchion tube.

8. The suspension fork according to claim 1, wherein said at least one connecting duct can be shut off at least in one direction.

9. The suspension fork according to claim 1, wherein said at least one slider tube is locked relative to the stanchion tube in any desired compressed position beneath the damper position defined by the predetermined distance.

10. The suspension fork according to claim 1, wherein the predetermined distance is between 20% and 50% of a maximum spring travel.

11. The suspension fork according to claim 1, wherein the damper system comprises a control section at a stanchion tube wherein the control section is positioned above said first chamber.

12. The suspension fork according to claim 1, further comprising a joint adjusting element wherein by way of the joint adjusting element, the shut-off valve of the rebound stage and a shut-off valve of the compression stage are each adjustable.

13. The suspension fork according to claim 12, further comprising a fork crown, wherein said joint adjusting element is pivotally attached to said at least one stanchion tube or to said-fork crown.

14. The suspension fork according to claim 1, wherein at least one of said at least one shut-off valve and said at least one damper are controlled remotely by electrical actuation or magnetic actuation.

15. The suspension fork according to claim 1, wherein at least a part of said at least one slider tube consists of a fibrous composite material and at least a part of said at least one stanchion tube consists of metal.

* * * * *